US012730847B2

(12) United States Patent
Son et al.

(10) Patent No.: US 12,730,847 B2
(45) Date of Patent: Sep. 8, 2026

(54) METHOD AND APPARATUS FOR CONSTRUCTING PERSONAL PROFILE

(71) Applicant: ELECTRONICS AND TELECOMMUNICATIONS RESEARCH INSTITUTE, Daejeon (KR)

(72) Inventors: Jeongwoo Son, Daejeon (KR); Hyungkeuk Lee, Daejeon (KR); Alex Lee, Daejeon (KR); Nam Kyung Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 741 days.

(21) Appl. No.: 17/973,765

(22) Filed: Oct. 26, 2022

(65) Prior Publication Data

US 2023/0237108 A1 Jul. 27, 2023

(30) Foreign Application Priority Data

Jan. 27, 2022 (KR) ........................ 10-2022-0012623

(51) Int. Cl.

*G06F 16/9535* (2019.01)
*G06F 16/951* (2019.01)
*G06N 3/08* (2023.01)

(52) U.S. Cl.

CPC ........ *G06F 16/9535* (2019.01); *G06F 16/951* (2019.01); *G06N 3/08* (2013.01)

(58) Field of Classification Search

CPC ............... G06F 16/9535; G06F 16/951; G06F 3/011–015; G06F 2203/011;

(Continued)

(56) References Cited

U.S. PATENT DOCUMENTS 8,498,439 B2 7/2013 Bae et al.
11,108,881 B2 8/2021 Peterson (Continued)

FOREIGN PATENT DOCUMENTS

KR 10-2011-0017696 A 2/2011
KR 10-2012-0063560 A 6/2012

(Continued)

OTHER PUBLICATIONS

Malekzadeh, Mohammad, Richard G. Clegg, and Hamed Haddadi. "Replacement autoencoder: A privacy-preserving algorithm for sensory data analysis." 2018 IEEE/ACM third international conference on internet-of-things design and implementation (iotdi). IEEE, 2018. (Year: 2018).*

(Continued)

*Primary Examiner* — Liang Y Li

(74) *Attorney, Agent, or Firm* — LRK PATENT LAW FIRM

(57) ABSTRACT

A method for generating a personal profile in a user device is provided. The user device extracts meaningful data from daily data of the user, extracts semantic information by analyzing the meaningful data, and then generates a current user profile having a single vector form using the meaningful data and the semantic information, and stores the current user profile in a data storage unit.

13 Claims, 6 Drawing Sheets

(58) Field of Classification Search
CPC .. G06F 21/6245–6263; G06F 21/6254; G06N 3/08–0985; G06N 3/02–105; G06N 3/0455
See application file for complete search history.

(56) References Cited

U.S. PATENT DOCUMENTS

| | | | | |
|---|---|---|---|---|
| 11,526,626 | B2 * | 12/2022 | Kuta | G06V 10/82 |
| 2007/0299807 | A1 | 12/2007 | Lea et al. | |
| 2009/0157834 | A1 | 6/2009 | Krishnaswamy | |
| 2010/0114803 | A1 | 5/2010 | Moon et al. | |
| 2020/0104323 | A1 | 4/2020 | Kam et al. | |
| 2020/0204643 | A1 * | 6/2020 | Zhou | H04M 1/72448 |
| 2021/0133560 | A1 | 5/2021 | Jung et al. | |
| 2021/0174422 | A1 | 6/2021 | Sim et al. | |
| 2022/0070150 | A1 * | 3/2022 | Haerterich | G06N 3/088 |
| 2022/0116199 | A1 | 4/2022 | Kim et al. | |
| 2022/0249906 | A1 * | 8/2022 | Phillips | A61B 5/7264 |
| 2022/0269816 | A1 * | 8/2022 | Qian | G06N 20/00 |
| 2022/0335160 | A1 * | 10/2022 | Chapman | G06N 3/048 |
| 2022/0366083 | A1 * | 11/2022 | Parlak | H04L 63/0407 |

FOREIGN PATENT DOCUMENTS

| | | | |
|---|---|---|---|
| KR | 10-2012-0119422 | A | 10/2012 |
| KR | 10-1441983 | B1 | 9/2014 |
| KR | 10-2019-0067994 | A | 6/2019 |
| KR | 10-2019-0107614 | A | 9/2019 |
| KR | 10-2021-0052958 | A | 5/2021 |
| KR | 10-2021-0058127 | A | 5/2021 |
| KR | 10-2021-0069860 | A | 6/2021 |
| KR | 10-2021-0158824 | A | 12/2021 |

OTHER PUBLICATIONS

Ignatov, Andrey. “Real-time human activity recognition from accelerometer data using convolutional neural networks.” Applied Soft Computing 62 (2018): 915-922. (Year: 2018).*

Li, En, et al. “Edge AI: On-demand accelerating deep neural network inference via edge computing.” IEEE transactions on wireless communications 19.1 (2019): 447-457. (Year: 2019).*

* cited by examiner

FIG. 2

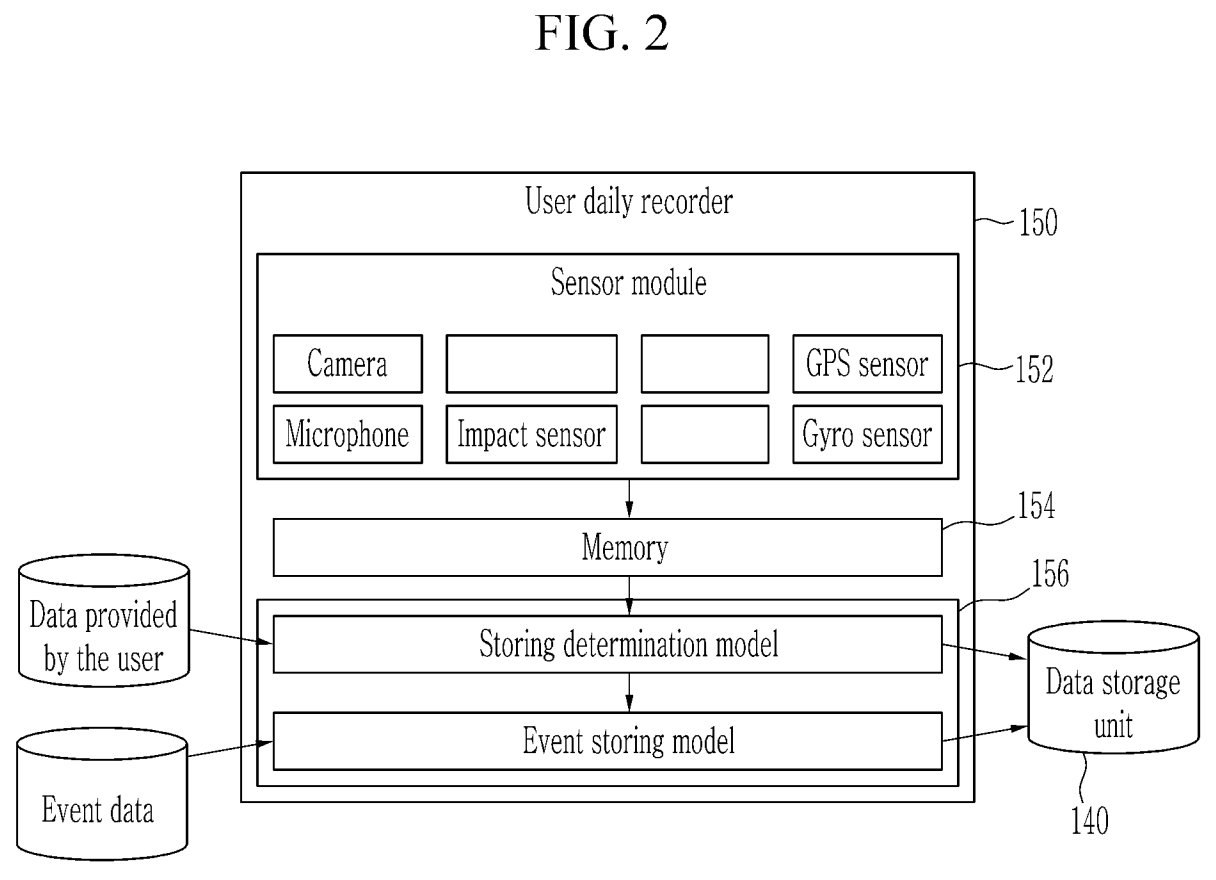

User daily recorder

150

Sensor module

152

Camera

Microphone

Impact sensor

GPS sensor

Gyro sensor

Memory

154

156

Storing determination model

Event storing model

Data storage unit

140

Data provided by the user

Event data

METHOD AND APPARATUS FOR CONSTRUCTING PERSONAL PROFILE

CROSS-REFERENCE TO RELATED APPLICATION

This application claims priority to and the benefit of Korean Patent Application No. 10-2022-0012623 filed in the Korean Intellectual Property Office on Jan. 27, 2022, the entire contents of which are incorporated herein by reference.

BACKGROUND OF THE INVENTION

1. Field of the Invention

The present disclosure relates to a method and apparatus for constructing a personal profile, and more particularly, a method and apparatus for constructing a personal profile that can collect daily information of a user, construct a personal profile, and effectively deliver the personal profile to a service that the user wants to use.

2. Description of Related Art

Personalization services are rapidly spreading beyond daily search and recommendation to finance, manufacturing, and agriculture. It can be seen that the personal profile construction technology, which stores and analyzes user activities in the Internet space for a long period of time, plays a large role.

Personal profile construction technology that analyzes an individual's activity and extracts a preferred topic, product, place, etc. is an essential element for various services.

In general, a user profile is constructed based on activities on the Internet or a corresponding service, such as service use history and search history, and the user profile constructed in this way is expected to create value in various fields and to be used in various fields.

However, there are concerns about invasion of privacy due to the indiscriminate collection and provision of personal data or concern about the processing and using of data even if the person does not want it. Accordingly, recently, discussions on the right of users to use their data have been actively conducted.

In addition, various services provide personalization services based on the collection of a wide range of user information, but there is a limit in enhancing personalization performance because it is limited to the corresponding services.

SUMMARY OF THE INVENTION

The present disclosure has been made in an effort to provide a method and apparatus for constructing a personal profile capable of preventing indiscriminate use of user information while improving personalization performance based on user information.

According to one embodiment, a method for generating a personal profile in a user device is provided. The method for generating a personal profile includes: collecting daily data of a user; extracting meaningful data from the collected daily data; extracting semantic information by analyzing the meaningful data; generating a current user profile having a single vector form using the meaningful data and the semantic information; and storing the current user profile in a data storage unit.

The generating may include: combining the meaningful data and the semantic information; generating a user profile having the single vector form from the combined information using a network model learned; and generating the current user profile by combining the user profile generated using the network model and a previous user profile stored in the data storage unit immediately before.

The method for generating a personal profile may further include reproducing the meaningful data and the semantic information using at least one information reproduction model from the current user profile.

The collecting may include collecting data sensed from at least one sensor, and the at least one information reproduction model may correspond to the at least one sensor.

The method for generating a personal profile may further include: receiving a user profile request from a server providing a service; and transmitting the user profile and the at least one information reproduction model to the server according to the user profile request.

The user profile request may include a type of information representation model, and the transmitting may include transmitting an information representation model of the type.

The method for generating a personal profile may further include measuring an error of the reproduced information.

The method for generating a personal profile may further include learning the parameters of the at least one information reproduction model to minimize the error.

The extraction of meaningful data may include: extracting the meaningful data from the collected daily data using a storing determination model that returns a value between 0 and 1 regarding whether the data are meaningful to the user; extracting event data from data determined to be meaningless in the storing determination model using an event storing model that returns a value between 0 and 1 regarding whether it is event data; and determining the event data as the meaningful data.

According to another embodiment, an apparatus for generating a personal profile that generates a personal profile from daily life of a user is provided. The apparatus for generating a personal profile includes: a user profile storage unit; a user data analyzer that analyzes the daily data of the user, and extracts semantic information; and a user profile generator that generates a current user profile having a single vector form based on the daily data of the user and the semantic information, and stores the current user profile in the user profile storage unit.

The apparatus for generating a personal profile may further include: a data storage unit; and a user daily recorder that collects daily data of the user, extracts meaningful data from the collected daily data and stores the meaningful data in the data storage unit, wherein the user data analyzer may analyze meaningful data stored in the data storage unit among the daily data.

The user daily recorder may include: at least one sensor for sensing the daily data of the user; and a data storing determiner that determines data to be stored in the data storage unit as the meaningful data from the user's daily data, and the data storing determiner may include: a storing determination model that returns a value between 0 and 1 regarding whether input data is meaningful; and an event storing model that returns a value between 0 and 1 regarding whether data determined to be meaningless in the storing determination model is event data.

The storing determination model may be learned based on previous data provided by the user, and the event storing model may be learned based on the event data.

The apparatus for generating a personal profile may further include an information reproduction processor including at least one information reproduction model that reproduces the meaningful data and the semantic information from the current user profile.

The daily data may include data sensed from at least one sensor, and the at least one information reproduction model may correspond to the at least one sensor.

The apparatus for generating a personal profile may further include a user profile provider that provides the user profile and the at least one information reproduction model to the server in response to a user profile request from a server providing a service.

The user profile request may include a type of information representation model, and the user profile provider may provide the type of information reproduction model.

The apparatus for generating a personal profile may further include a reproduction error measurer that measures an error of information reproduced by the at least one information reproduction model.

The information reproduction processor may learn parameters of the at least one information reproduction model to minimize the error.

The user profile generator may include: a data combiner for combining the meaningful data and the semantic information; a vector generation model for generating a user profile having the single vector form from the combined information; and a user profile combiner for generating the current user profile by combining the user profile generated from the vector generation model and a previous user profile stored in the data storage unit immediately before.

BRIEF DESCRIPTION OF THE DRAWINGS

FIG. 2 is a diagram illustrating a user daily recorder shown in FIG. 1.

DETAILED DESCRIPTION OF THE EMBODIMENTS

Figure 1:
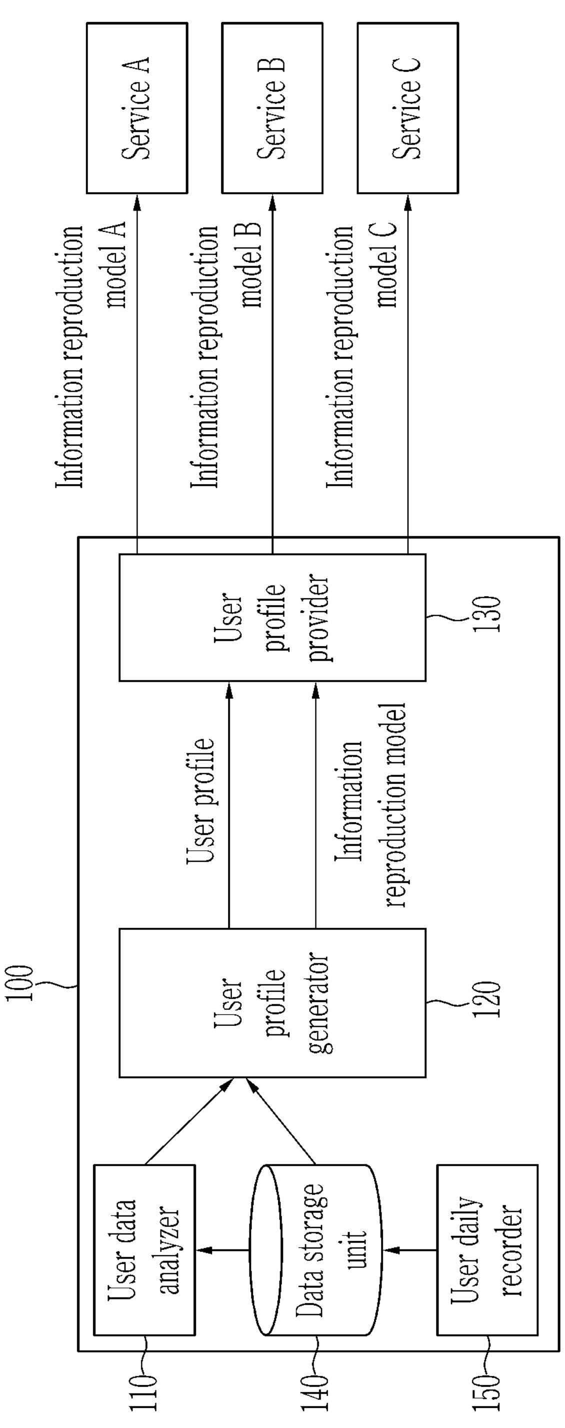
FIG. 1 is a diagram illustrating an apparatus for generating a personal profile according to an embodiment.

Hereinafter, embodiments of the disclosure will be described in detail with reference to the attached drawings so that a person of ordinary skill in the art may easily implement the disclosure. As those skilled in the art would realize, the described embodiments may be modified in various different ways, all without departing from the spirit or scope of the disclosure. The drawings and description are to be regarded as illustrative in nature and not restrictive. Like reference numerals designate like elements throughout the specification.

Throughout the specification and claims, when a part is referred to "include" a certain element, it means that it may further include other elements rather than exclude other elements, unless specifically indicated otherwise.

Expressions described in the singular herein may be construed as singular or plural unless an explicit expression such as "one" or "single" is used.

Furthermore, in this specification, each of the phrases such as "A or B", "at least one of A and B", "at least one of A or B", "A, B, or C", "at least one of A, B, and C", and "at least one of A, B, or C" may include any one of the items listed together in the corresponding one of the phrases, or all possible combinations thereof.

Now, a method and apparatus for constructing a personal profile according to an embodiment of the present disclosure will be described in detail with reference to the drawings.

FIG. 1 is a diagram illustrating an apparatus for generating a personal profile according to an embodiment.

Referring to FIG. 1, the apparatus for generating a personal profile 100 includes a user data analyzer 110, a user profile generator 120, and a user profile provider 130. The apparatus for generating a personal profile 100 may further include a data storage unit 140 and a user daily recorder 150. The user daily recorder 150 may be implemented as a separate device from the apparatus for generating a personal profile 100.

The user daily recorder 150 collects user daily data of the user. The user daily recorder 150 collects the user surrounding information for a certain period, determines whether the user surrounding information collected during the certain period is meaningful as user daily data, and when it is meaningful, stores the data collected during the corresponding period in the data storage unit 140.

The user daily recorder 150 may separate the user daily data into continuous data and event data of key moments, may store it in the data storage unit 140, and may manage the user daily data. For example, if daily life is stored using a camera, video data of a certain length may correspond to continuous data, and a specific frame extracted from video data of a certain length may correspond to event data.

The data storage unit 140 stores the daily data of the user.

The user data analyzer 110 analyzes the user daily data stored in the data storage unit 140 and extracts high-dimensional semantic information contained in the data. The semantic information to be extracted is not limited. For example, in the case of a picture, an object, person, place, time, etc. appearing in the picture may be extracted, in the case of a video, an action may be extracted, and in the case of a voice, a speech sound, a background sound, etc. may be extracted. In the case of a global positioning system (GPS) signal, whether the corresponding path is a commuting path or a walking path may be extracted. The user data analyzer 110 stores the extracted semantic information by pairing it with the user daily data from which the corresponding semantic information is extracted.

The user profile generator 120 generates a user profile based on the user daily data stored in the data storage unit 140 and semantic information extracted through the user data analyzer 110. The user profile generator 120 expresses the user profile as a vector of an arbitrary dimension. The value of the vector may be reproduced from the vector as the user daily data stored in the data storage unit 140 and semantic information extracted through the user data analyzer 110.

The user profile generator 120 may use the learned vector generation model and the information reproduction model. The vector generation model generates a user profile from input data, but expresses the user profile as a single vector. The information reproduction model reproduces the vector value output from the vector generation model as data again. A plurality of such information reproduction models may be configured according to the type of data input to the user profile generator 120, and the information reproduction model for each type of data is learned to reproduce the corresponding type of data.

The user profile generator 120 stores the user profile generated in the form of a single vector.

The user profile provider 130 transmits the user profile along with the information reproduction model to a specific service according to a user's request. The user profile provider 130 may transmit all information reproduction models capable of reproducing all information of the user profile according to a user's request, or may transmit only some information reproduction models to limit the information provision range of the user profile.

For example, the user profile provider 130 transmits the user profile and the information reproduction model A to the service A, transmits the user profile and the information reproduction model B to the service B, and transmits the user profile and the information reproduction model C to the service C.

In this way, only the information reproduced respectively by the information reproduction model A, the information reproduction model B, and the information reproduction model C can be used for the service in the service A, the service B, and the service C, respectively.

The apparatus for generating a personal profile 100 may be implemented in a user device.

Alternatively, the apparatus for generating a personal profile 100 may be implemented in a device separate from the user device. In this case, the user profile generated by the apparatus for generating a personal profile 100 and information reproduction model may be stored in the user device.

FIG. 2 is a diagram illustrating a user daily recorder shown in FIG. 1.

Referring to FIG. 2, the user daily recorder 150 includes a sensor module 152, a memory 154, and a data storing determiner 156.

The sensor module 152 may include a plurality of sensors for sensing the user daily data. The sensor module 152 may include a camera for recording an image and a microphone for recording a sound. The sensor module 152 may further include an impact sensor, a GPS sensor, a gyro sensor, and the like.

The user daily recorder 150 may be implemented as a small device that the user can carry on the body.

The memory 154 stores data sensed by the sensors of the sensor module 152. An external storage device, through a network, may be used to store data sensed by the sensors of the sensor module 152.

The data storing determiner 156 determines whether to store the data sensed by the sensors of the sensor module 152 as meaningful daily data in the data storage unit 140. The data storing determiner 156 loads and uses a learned storing determination model and a learned event storing model to determine whether to store data sensed by the sensors.

The storing determination model is learned based on previous data provided by the user (e.g., photo album, video, recording, movement record, etc.), and is continuously updated as user experience is accumulated. The storing determination model determines whether the data sensed by the sensor module 152 is meaningful.

Given the data Ds of any sensor provided by the user, a storing determination model is constructed based on this. In this case, the storing determination model is expressed as $Ds(x:\theta)$. Here, x is input sensor data, and $\theta$ is a parameter. $Ds(x:\theta)$ returns a value between 0 and 1 regarding whether the input sensor data x is meaningful. The closer to 1, the more meaningful the data is. $Ds(x:\theta)$ receives the newly obtained data as an input, and outputs a result of whether the corresponding data is meaningful data.

When the value output from $Ds(x:\theta)$ is greater than or equal to a first threshold value, the storing determination model 156 determines that the corresponding data is meaningful as the user daily data and stores the data in the data storage unit 140. In this case, the first threshold value may be set by the user, and the amount of stored data may be adjusted by adjusting the first threshold value. That is, if the first threshold value is set to be small, more user daily data is stored, and if the threshold value is set to be large, only data at an important moment among the user daily data is stored. $\theta$ is estimated through learning, and $\theta$ can be learned to output 1.0 if it is similar to the data Ds and 0.0 if it is not similar to the data Ds. The specific form of $\theta$ is defined according to the sensor. For example, $\theta$ may be defined as a kernel of a convolutional neural network in the case of a photo, may be defined as a parameter of ResNet 3D in the case of a video, and may be defined as a parameter of a VGGish model in the case of a video.

Meanwhile, even in the case of data that are determined to be meaningless in the storing determination model, a case in which the data must be stored may occur. An example is the moment when a user has an accident. For such specific event data, whether to store or not is determined using the event storing model. A common data set for a specific event is constructed, and the event storing model is learned using the common data set, and then can be used.

For example, if a specific event can be detected through data of a camera sensor, event data De is first constructed, and an event storing model is learned using the event data De. The event storing model is expressed as $De(x:r)$. $De(x:r)$ returns a value between 0 and 1 regarding whether the data x determined not to be stored by the storing determination model corresponds to a specific event. The specific form of r is defined according to the sensor. The r may be learned to output a value close to 1.0 when the input data x is similar to the event data De and to output a value close to 0.0 when input data x is not similar to the event data De. When the value output from $De(x:r)$ is greater than or equal to a second threshold value, the data storing determiner 156 determines that the corresponding data is meaningful as the user daily data and stores the data in the data storage unit 140.

In this way, the data storing determiner 156 may determine to store the input sensor data based on the values output from the storing determination model and the event storing model, and store it in the data storage unit 140. The data storing determiner 156 may store the data determined to be stored in the internal memory 154.

Figure 3:
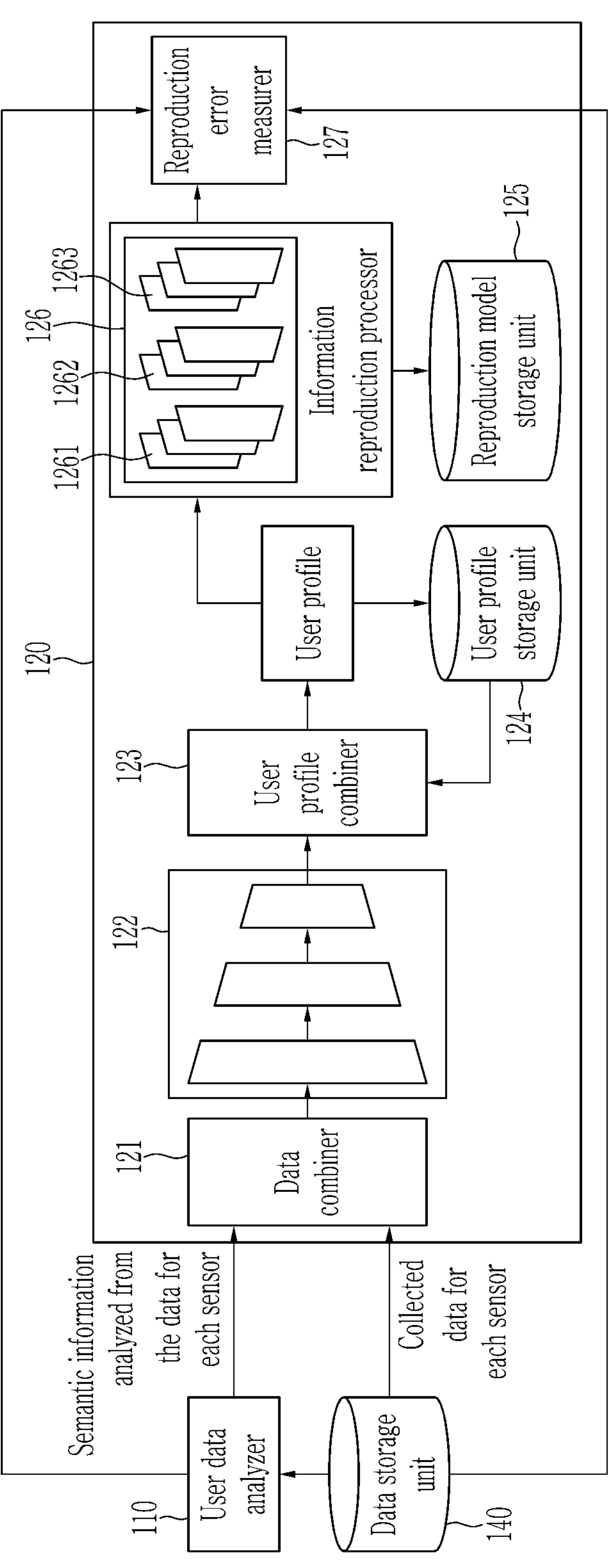
FIG. 3 is a diagram illustrating the user profile generator shown in FIG. 1.

FIG. 3 is a diagram illustrating the user profile generator shown in FIG. 1.

Referring to FIG. 3, the user profile generator 120 converts sensor data stored in the data storage unit 140 and semantic information extracted by the user data analyzer 110 into a user profile in a form of a single vector. Through this, the user can hide personal sensitive information, and the apparatus can efficiently store and manage the user information.

The user profile generator 120 includes a data combiner 121, a vector generation model 122, a user profile combiner 123, a user profile storage unit 124, a reproduction model storage unit 125, an information reproduction processor 126, and a reproduction error measurer 127.

The data combiner 121 simply combines the collected data for each sensor stored in the data storage unit 140 and the semantic information analyzed and extracted from the data for each sensor, and transmits the combined data to the vector generation model 122.

The vector generation model 122 has the form of a deep learning network having multiple layers. As an example, FIG. 3 illustrates a vector generation model 122 having three layers, and a method for generating a user profile of a vector form based on the vector generation model 122 having three layers will be described below.

The vector generation model 122 receives data output from the data combiner 121 as an input, generates the user profile in the form of a single vector, and outputs the user profile in the form of a single vector. The output of each layer of the vector generation model 122 is designed to have a reduced dimension compared to the input or to have the same dimension as the input, and through this, a user profile can be generated with a vector having the same dimension as the input or a lower dimensional vector than the input.

The parameters of the vector generation model 122 are learned together with the parameters of the information reproduction models 1261, 1262, and 1263. A loss function is defined so that each information reproduction model 1261, 1262, and 1263 reproduces the corresponding sensor data and semantic information as accurately as possible from a single vector generated by the vector generation model 122, and the parameters of the vector generation model 122 and information reproduction models 1261, 1262, and 1263 may be learned based on the loss function. The learned information reproduction models 1261, 1262, and 1263 are stored in the reproduction model storage unit 125.

The information reproduction processor 126 may include a plurality of information reproduction models 1261, 1262, and 1263 according to the type of sensor data. Also, the information reproduction processor 126 may further include a reproduction error measurer 127. In FIG. 3, three types of information reproduction models 1261, 1262, and 1263 are shown assuming three types of sensor data. The number of information reproduction models 1261, 1262, and 1263 is not limited according to the type of sensor data.

The reproduction error measurer 127 receives the user profile as an input and measures the error from the information reproduced by the information reproduction models 1261, 1262, and 1263. The reproduction error measurer 127 compares the information reproduced by the information reproduction models 1261, 1262, and 1263 with input data of the vector generation model 122, that is, semantic information extracted by the user data analyzer 110 and sensor data stored in the storage unit 140, and measures the error. The information reproduction processor 126 continuously learns the parameters of the information reproduction models 1261, 1262, and 1263 to minimize the measured error.

It is assumed that the vector generation model 122 is expressed by Me, and that the input data x of Me are composed of [v, cv, p, cp, a, and ca]. Here, v is video, cv is semantic information extracted from video, p is picture, cp is semantic information extracted from picture, a is audio, and ca is semantic information extracted from audio. In this case, six information reproduction models may be configured according to data types. The information reproduction models corresponding to [v, cv, p, cp, a, ca] are expressed as Md_v, Md_cv, Md_p, Md_cp, Md_a, and Md_ca, respectively.

The Me having x as input generates a single vector x'. Each of Md_v, Md_cv, Md_p, Md_cp, Md_a, and Md_ca must be capable of reproducing the corresponding input data from a single vector x'. That is, $Md\_v(x') \approx v$, $Md\_cv(x') \approx cv$, $Md\_p(x') \approx p$, $Md\_cp(x') \approx cp$, $Md\_a(x') \approx a$, and $Md\_ca(x') \approx ca$.

@@@ In this way, the information reproduction processor 126 learns the parameters of Md_v, Md_cv, Md_p, Md_cp, Md_a, and Md_ca, and stores the learned Md_v, Md_cv, Md_p, Md_cp, Md_a, and Md_ca in the reproduction model storage unit 125.

The user profile combiner 123 generates a current user profile by combining the user profile output from the vector generation model 122 with the previously generated user profile, and stores it in the user profile storage unit 124. The user profile combiner 123 generates the current user profile z by combining the user profile x' output from the vector generation model 122 and the previous user profile y through a combining function. The combining function is defined as $Merge(x', y; \delta)$, and the parameter δ can be learned to reproduce x' and y from z.

Figure 4:
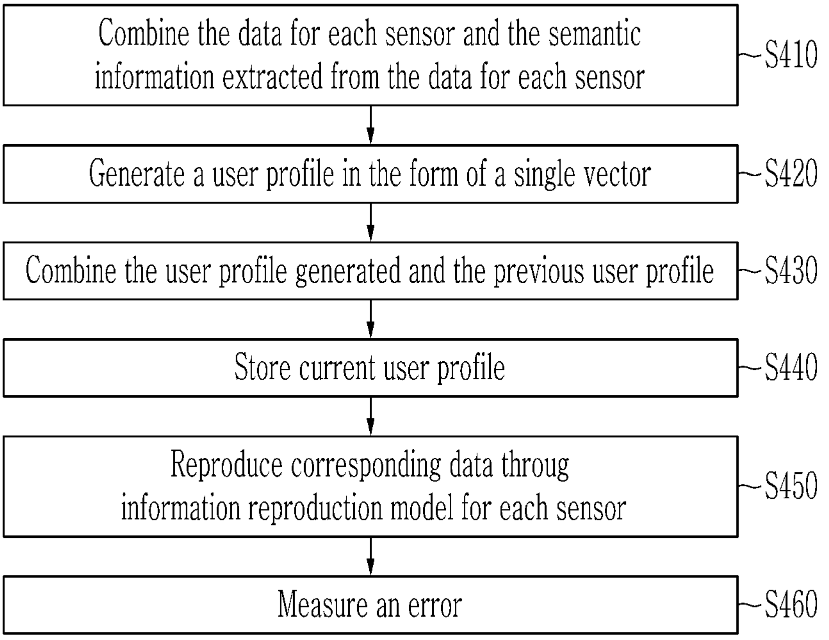
FIG. 4 is a flowchart illustrating a method for generating a user profile in the user profile generator shown in FIG. 1.

FIG. 4 is a flowchart illustrating a method for generating a user profile in the user profile generator shown in FIG. 1.

Referring to FIG. 4, the data stored for each sensor in the data storage unit 140 and the semantic information analyzed and extracted from the data for each sensor are simply combined through the data combiner 121 and transmitted to the vector generation model 122 (S410).

The vector generation model 122 generates a user profile in the form of a single vector from the data output from the data combiner 121 (S420).

The user profile generated from the vector generation model 122 is combined with the previous user profile stored in the user profile storage unit 124 immediately before through the user profile combiner 123 to generate a current user profile (S430).

The generated current user profile is stored in the user profile storage unit 124 (S440).

In addition, the current user profile is input to each information reproduction model 1261, 1262, and 1263 of the information reproduction processor 126. The information reproduction models 1261, 1262, and 1263 may correspond to data for each sensor.

The information reproduction models 1261, 1262, and 1263 respectively reproduce corresponding data from the received user profile (S450).

The reproduction error measurer 127 measures an error from the information reproduced by the information reproduction models 1261, 1262, and 1263 (S460). The reproduction error measurer 127 compares the information reproduced by the information reproduction models 1261, 1262, and 1263 with input data of the vector generation model 122, that is, semantic information extracted by the user data analyzer 110 and sensor data stored in the storage unit 140, and measures the error.

Figure 5:
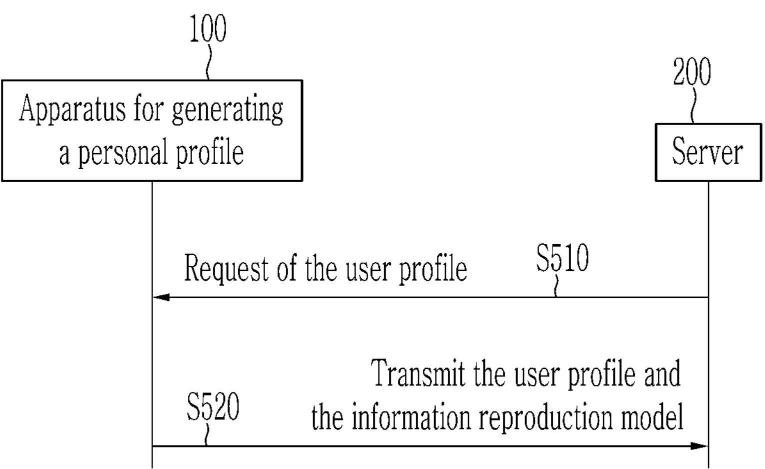
FIG. 5 is a diagram illustrating a method for providing a user profile by the user profile provider shown in FIG. 1.

FIG. 5 is a diagram illustrating a method for providing a user profile by the user profile provider shown in FIG. 1.

Referring to FIG. 5, the external service may request a user profile to provide a personalized service to the user. The request of the user profile can be realized through RESTful application programming interface (API).

The server 200 that provides an external service transmits a request of the user profile to the apparatus for generating a personal profile 100 (S510). The request of the user profile includes type information of the information representation model.

The apparatus for generating a personal profile 100 may accept or reject the request. If accepted, the apparatus for generating a personal profile 100 transmits the user profile and the information reproduction model of a requested type to the server 200 (S520). For example, assuming that service A requests a user profile for video recommendation, the server providing service A requests "user profile z" and "Md_cp capable of reproducing cp from z" from user B. When the request of the server 200 is accepted, the apparatus for generating a personal profile 100 transmits the user profile z and the information reproduction model Md_cp to the server 200.

In this case, the information representation model may be provided after being converted into a structured string containing the structure and parameters of the information representation model. If the information related to the structure of the information reproduction model is shared between the apparatus for generating a personal profile 100 and the server 200 through prior information exchange, the apparatus for generating a personal profile 100 transmits only a part of the information reproduction model to the server. This can increase the transmission efficiency. That is, if the structure of the information reproduction model follows the structure of the Inception model, only parameters can be provided, and if only the final layer is learned from the inception model, only the parameters of that layer can be provided.

The server 200 extracts necessary information based on the received service profile and information reproduction model, and provides a personalized service based on the extracted information. For example, when the server 200 receives z and Md_cp, it may extract object, place, and person information that the user encounters in daily life based on the z and Md_cp, and may provide a personalized service based on the extracted object, place, and person information.

Figure 6:
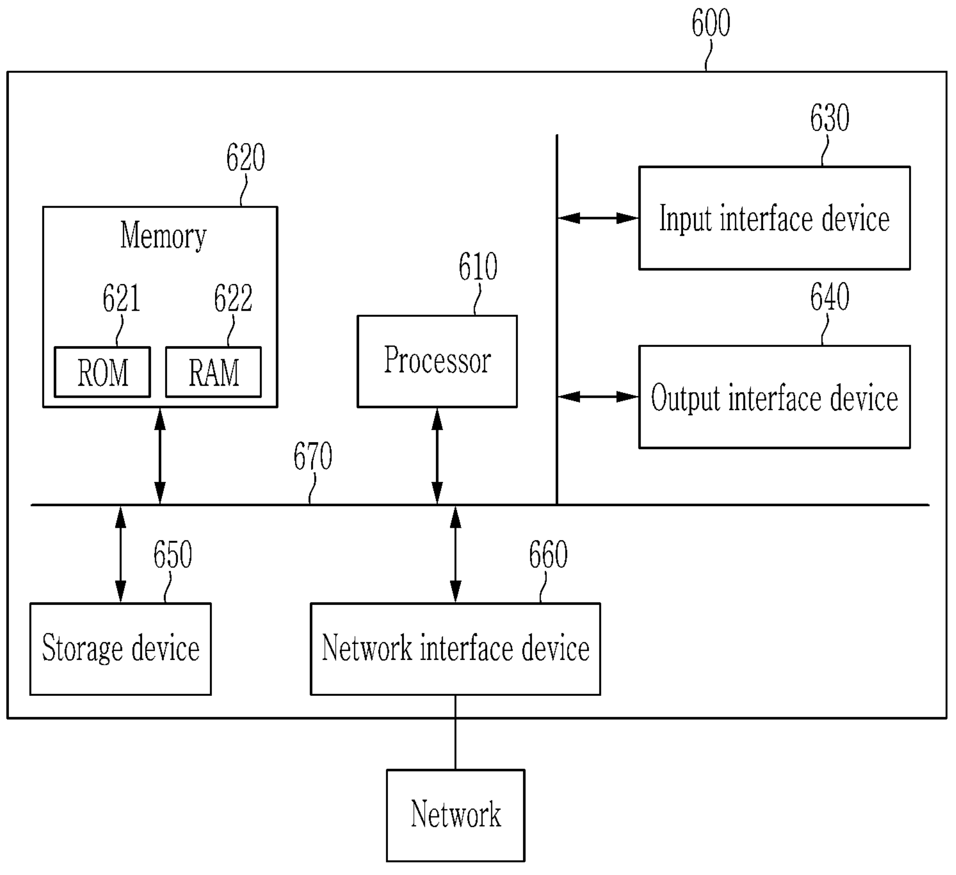
FIG. 6 is a diagram illustrating an apparatus for generating a personal profile according to another embodiment.

FIG. 6 is a diagram illustrating an apparatus for generating a personal profile according to another embodiment.

Referring to FIG. 6, the apparatus for generating a personal profile 600 may represent a computing device in which the aforementioned method for generating a personal profile is implemented. The apparatus for generating a personal profile 600 may be implemented in a user device.

The apparatus for generating a personal profile 600 may include at least one of a processor 610, a memory 620, an input interface device 630, an output interface device 640, a storage device 650, and a network interface device 660. Each of the components may be connected by a common bus 670 to communicate with each other. In addition, each of the components may be connected through an individual interface or a separate bus centering on the processor 610 instead of the common bus 670.

The processor 610 may be implemented as various types such as an application processor (AP), a central processing unit (CPU), a graphics processing unit (GPU), etc., and may be any semiconductor device that executes a command stored in the memory 120 or the storage device 150. The processor 610 may execute program commands stored in at least one of the memory 620 and the storage device 650. The processor 110 stores program commands for implementing at least some functions of the user data analyzer 110, the user profile generator 120, the user profile provider 130, and the user daily recorder 150 described with reference to FIG. 1 in the memory 120, and may control to perform the operation described with reference to FIGS. 1 to 5.

The memory 620 and the storage device 650 may include various types of volatile or non-volatile storage media. For example, the memory 620 may include a read-only memory (ROM) 621 and a random access memory (RAM) 622. The memory 620 and the storage device 650 may include a data storage unit 140. The memory 620 may be located inside or outside the processor 610, and the memory 620 may be connected to the processor 610 through various known means.

The input interface device 630 is configured to provide data to the processor 610.

The output interface device 640 is configured to output data from the processor 610.

The network interface device 660 may transmit or receive a signal with another device (e.g., a server) through a wired network or a wireless network.

At least some of the method for generating a personal profile according to an embodiment of the present disclosure may be implemented as a program or software executed in a computing device, and the program or software may be stored in a computer-readable medium.

In addition, at least some of the method for generating a personal profile according to an embodiment of the present disclosure may be implemented as hardware capable of being electrically connected to the computing device.

According to an embodiment, by generating a user profile in a single vector form from the daily record of the user, a wide range of user information can be profiled, and since the personal information of the user can be selectively provided to the service by the user, it can solve the problem of indiscriminate collection. In addition, it can be used to provide personalized service for new service providers or small businesses that have difficulty in collecting user information.

The components described in the example embodiments may be implemented by hardware components including, for example, at least one digital signal processor (DSP), a processor, a controller, an application-specific integrated circuit (ASIC), a programmable logic element such as an FPGA, other electronic devices, or combinations thereof. At least some of the functions or the processes described in the example embodiments may be implemented by software, and the software may be recorded on a recording medium. The components, functions, and processes described in the example embodiments may be implemented by a combination of hardware and software. The method according to embodiments may be embodied as a program that is executable by a computer, and may be implemented as various recording media such as a magnetic storage medium, an optical reading medium, and a digital storage medium. Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing, or to control an operation of a data processing apparatus, e.g., by a programmable processor, a computer, or multiple computers. A computer program(s) may be written in any form of programming language, including compiled or interpreted languages, and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network. Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic or magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read-only memory (CD-ROM), a digital video disk (DVD), etc., and magneto-optical media such as a floptical disk and a read-only memory (ROM), a random access memory (RAM), a flash memory, an erasable programmable ROM (EPROM), and an electrically erasable programmable ROM (EEPROM), and any other known computer readable media. A processor and a memory may be supplemented by, or integrated into, a special purpose logic circuit. The processor may run an operating system (OS) and one or more software applications that run on the OS. The processor device may also access, store, manipulate, process, and create data in response to execution of the software. For the purpose of simplicity, the description of a processor device is used as singular; however, one skilled in the art will appreciate that a processor device may include multiple processing elements and/or multiple types of processing elements. For example, a processor device may include multiple processors or a processor and a controller. In addition, different processing configurations are possible, such as parallel processors. Also, non-transitory computer-readable media may be any available media that may be accessed by a computer, and may include both computer storage media and transmission media. The present specification includes details of a number of specific implementations, but it should be understood that the details do not limit any disclosure or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination. Similarly, even though operations are described in a specific order in the drawings, it should not be understood as the operations needing to be performed in the specific order or in sequence to obtain desired results or as all the operations needing to be performed. In a specific case, multitasking and parallel processing may be advantageous. In addition, it should not be understood as requiring separation of various apparatus components in the above-described example embodiments in all example embodiments, and it should be understood that the above-described program components and apparatuses may be incorporated into a single software product or may be packaged in multiple software products. It should be understood that the embodiments disclosed herein are merely illustrative and are not intended to limit the scope of the disclosure. It will be apparent to one of ordinary skill in the art that various modifications of the embodiments may be made without departing from the spirit and scope of the claims and their equivalents.

What is claimed is:

1. A method for generating a personal profile in a user device, the method comprising:

collecting daily data of a user;

extracting meaningful data from the collected daily data;

extracting semantic information by analyzing the meaningful data, wherein the semantic information includes contextual meaning inherent in the data;

generating a current user profile having a single vector form using the meaningful data and the semantic information;

storing the current user profile in a data storage unit;

reproducing the meaningful data and the semantic information using at least one information reproduction model from the current user profile;

receiving a user profile request from a server providing a service; and transmitting the current user profile and the at least one information reproduction model to the server according to the user profile request, wherein extracting the meaningful data includes:

extracting the meaningful data from the collected daily data using a storing determination model that returns a value between 0 and 1 regarding whether the data is meaningful to the user, wherein the data is determined as the meaningful data when the returned value is closer to 1;

extracting event data from data determined to be meaningless by the storing determination model using an event storing model that returns a value between 0 and 1 regarding whether the data is event data, wherein the data is determined as the event data when the returned value is closer to 1; and determining the event data as the meaningful data.

2. The method of claim 1, wherein the generating the current user profile includes:

combining the meaningful data and the semantic information;

generating a user profile having the single vector form from the combined information using a learned network model; and generating the current user profile by combining the user profile generated using the network model and a previous user profile stored in the data storage unit immediately before.

3. The method of claim 1, wherein:

the daily data includes data sensed from at least one sensor, and the at least one information reproduction model corresponds to the at least one sensor.

4. The method of claim 1, wherein:

the user profile request includes a type of information reproduction model, and the transmitting includes transmitting an information reproduction model of the type.

5. The method of claim 1, further comprising measuring an error of the reproduced information.

6. The method of claim 5, further comprising learning the parameters of the at least one information reproduction model to minimize the error.

7. An apparatus for generating a personal profile that generates a personal profile from daily life of a user, the apparatus comprising:

a data storage unit;

a user daily recorder configured to collect daily data of the user and to extract meaningful data from the collected daily data;

a user data analyzer configured to analyze the meaningful data and to extract semantic information from the meaningful data, wherein the semantic information includes contextual meaning inherent in the data;

a user profile generator configured to generate a current user profile having a single vector form using the meaningful data and the semantic information;

a user profile storage unit configured to store the current user profile;

an information reproduction processor including at least one information reproduction model configured to reproduce the meaningful data and the semantic information from the current user profile;

a user profile provider configured to transmit the current user profile and the at least one information reproduction model to a server in response to a user profile request from the server providing a service, wherein the user daily recorder is configured to extract the meaningful data by:

extracting the meaningful data from the collected daily data using a storing determination model that returns a value between 0 and 1 regarding whether the data is meaningful to the user, wherein the data is determined as the meaningful data when the returned value is closer to 1;

extracting event data from data determined to be meaningless by the storing determination model using an event storing model that returns a value between 0 and 1 regarding whether the data is event data, wherein the data is determined as the event data when the returned value is closer to 1; and determining the event data as the meaningful data.

8. The apparatus of claim 7, wherein:

the storing determination model is learned based on previous data provided by the user, and the event storing model is learned based on the event data.

9. The apparatus of claim 7, wherein:

the daily data includes data sensed from at least one sensor, and the at least one information reproduction model corresponds to the at least one sensor.

10. The apparatus of claim 7, wherein:

the user profile request includes a type of information reproduction model, and the user profile provider provides the type of information reproduction model.

11. The apparatus of claim 7, further comprising a reproduction error measurer that measures an error of information reproduced by the at least one information reproduction model.

12. The apparatus of claim 11, wherein the information reproduction processor learns parameters of the at least one information reproduction model to minimize the error.

13. The apparatus of claim 7, wherein the user profile generator includes:

a data combiner for combining the meaningful data and the semantic information;

a vector generation model for generating a user profile having the single vector form from the combined information; and a user profile combiner for generating the current user profile by combining the user profile generated from the vector generation model and a previous user profile stored in the data storage unit immediately before.

* * * * *